United States Patent

[11] 3,608,605

[72] Inventor William G. Cole
 6400 Jocelyn Hollow Road, Nashville, Tenn. 37205
[21] Appl. No. 811,563
[22] Filed May 28, 1969
[45] Patented Sept. 28, 1971

[54] PNEUMATIC TIRE CONSTRUCTION
 17 Claims, 10 Drawing Figs.
[52] U.S. Cl. .................................................. 152/361
[51] Int. Cl. .................................................. B60c 9/18
[50] Field of Search .......................................... 152/361

[56] References Cited
UNITED STATES PATENTS
3,131,744 5/1964 Boussu et al. .................. 152/361
3,205,931 9/1965 Keefe, Jr. ...................... 152/361 X
3,231,000 1/1966 Massoubre ..................... 152/361
3,310,093 3/1967 Frazier ......................... 152/361
3,335,777 8/1967 Hutch ........................... 152/361
3,441,074 7/1969 Pouilloux et al. ............... 152/361

Primary Examiner—Milton Buchler
Assistant Examiner—Carl A. Rutledge
Attorney—Oberlin, Maky, Donnelly and Renner ABSTRACT: A tire construction in which continuous loops of reinforcement cords are placed in the tread portion of the tire to achieve greater tread stability and strength and provide greater resistance to tread peel.

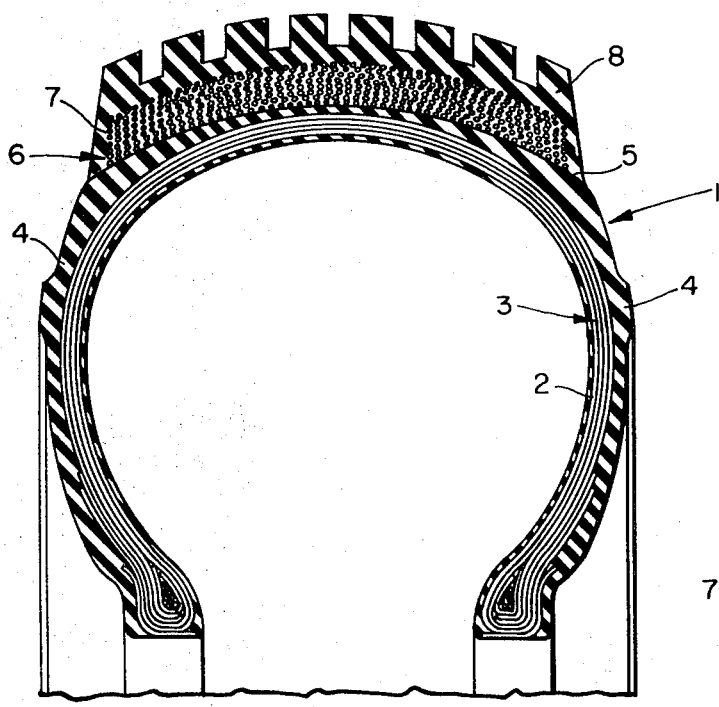
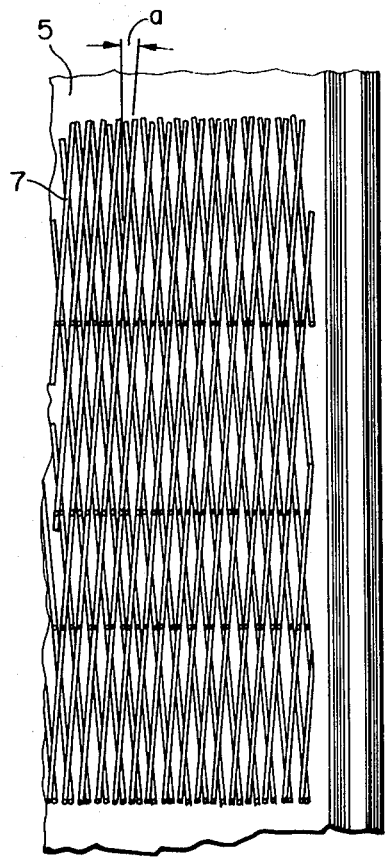
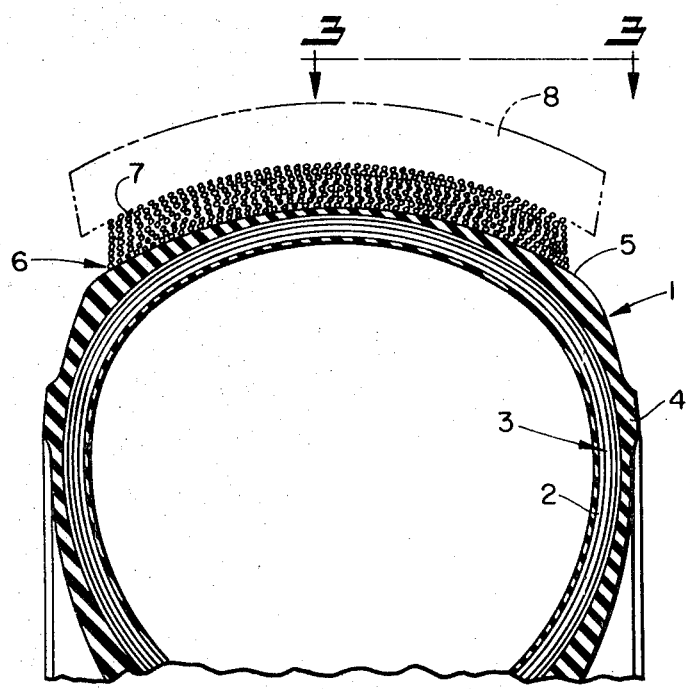
Fig. 1
Fig. 2
Fig. 3
INVENTOR
WILLIAM G. COLE

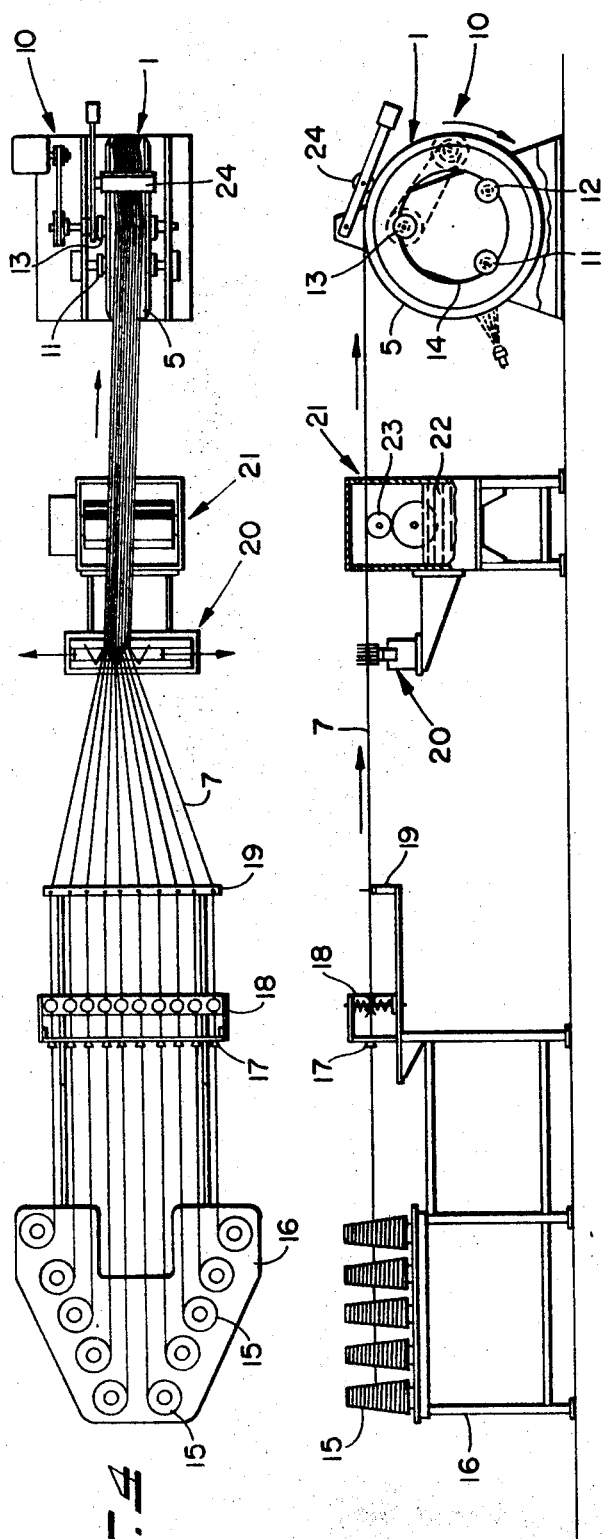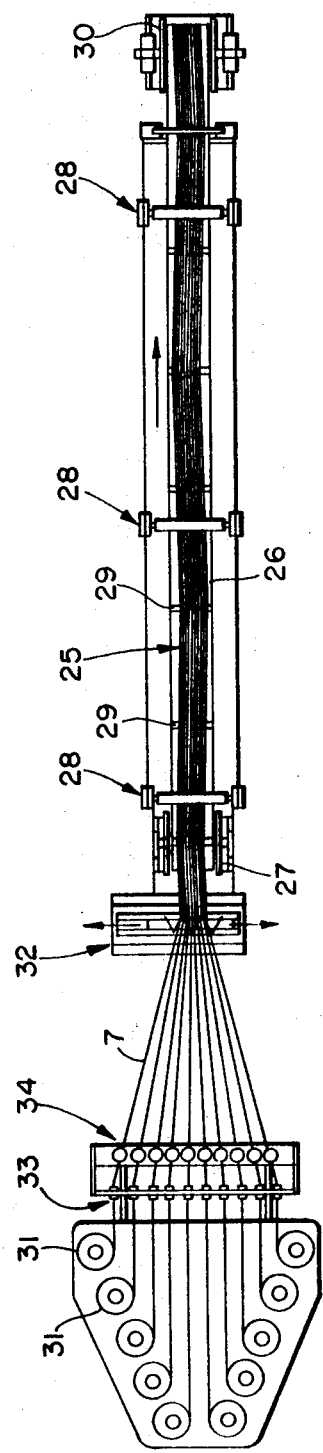

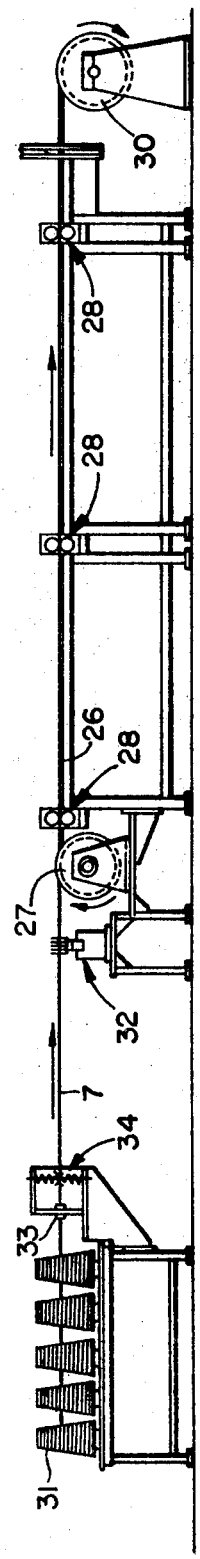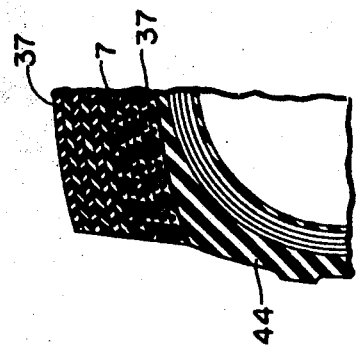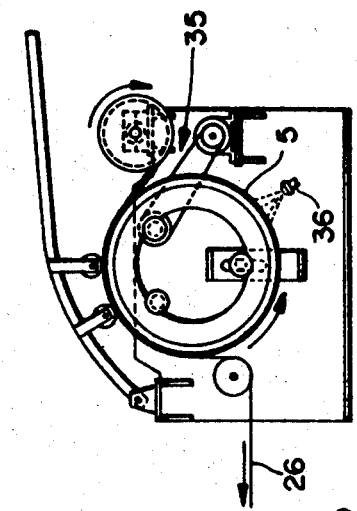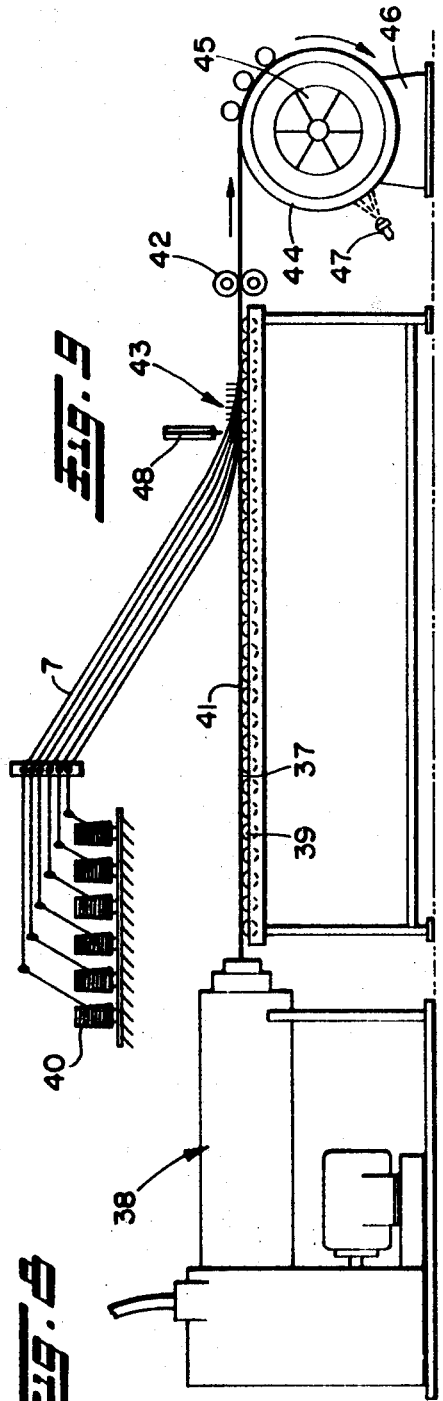

PNEUMATIC TIRE CONSTRUCTION

BACKGROUND OF THE INVENTION

The present invention relates generally as indicated to pneumatic tire constructions, and is particularly concerned with the manufacture of retarded tires, but it will be apparent that certain of the principles and techniques involved are also applicable to new tire constructions.

After the tread of a tire is completely worn, the tire carcass or casing may still be in relatively good condition, which oftentimes makes it economically practical to replace the worn out tread with a new one using conventional retreading techniques to extend the useful life of the tire. The used tire to be retreaded is first inspected for defects of a structural nature, and if it passes inspection, the tire is mounted on a power driven rotatable mandrel and inflated to assume its normal operating configuration. Then the tire is precisely fed into a power driven circular-shaped rasp which uniformly cuts off the old tread, leaving the tire with a smooth buffed outer surface which has a reasonably uniform surface thickness in the area to be retarded. If only a top cap tread is to be placed on the tire, buffing is confined to the tread area, whereas if a full retread is required, the buffing is continued down each sidewall for about one-fourth the thickness of the tire in the radial direction. After the tire has been properly buffed, it is transferred to a tire-building machine and the buffed surface is brush or spray coated with a uniform coating of a suitable air-drying cement. Before the cement has completely cured, the tire-building machine is caused to rotate the tire slowly, and at the same time a strip of die sized rubber or camel back having the proper width, thickness and tapered design for the specific tire being retreaded is fed onto the tire and forcibly pressed into place using specifically shaped rotating rollers to firmly and smoothly adhere the rubber to the old buffed casing. When a single complete wrap of the die sized rubber is completed, it is cut off and the ends are butted and stitched together in conventional manner.

Alternatively, the buffed tire may be mounted on a strip-winder machine and the tire continuously rotated as a ribbon of extruder produced and sized rubber is fed out and pressed against the buffed tire surface. The ribbon is applied to the tire in a continuous spiral fashion until the required amount of rubber for the retread is in place.

In any event, whether the tread rubber is applied in a single wrap or consists of a plurality of wraps of extruded rubber, afterwards the tire is fitted with a curing tube and inner curing rims inserted into a matrix or mold to which heat and pressure are applied for curing or vulcanizing the new rubber and adhering the new rubber to the old buffed and cemented surface. During the curing operation, the desired tread design is applied to the tread rubber. Then the tire is removed from the mold and the inner curing rims and curing bag are stripped off. Finally, the tire is inspected, and ready for use.

As apparent from the above, the complete retreading process is relatively simple and inexpensive as compared to the manufacture of new tires, primarily because the quality considerations for a retread tire are neither as numerous nor as stringent as in the case of a new tire. When a used tire is received for retreading, it has already been thermally conditioned by use and has been stretched until it has assumed the final configuration that it will retain for its retreaded life. Further, the original tire design presumably contained all of the stress-resisting members that were deemed necessary for its class and type of service, and therefore it is not required of the retreader that he build into the retreaded tire any additional strength.

The basic function of the retreader is simply to place on the worn tire a new rubber tread to enhance the service life of the tire which can be done at considerably less cost than the cost of a new tire. However, in the past such reduced cost has been offset to a greater or lesser extent, and in some instances completely negated because of the normally shorter life of a retreaded tire as compared to a new tire in use, and the tendency of the tread portion of a retread to peel off.

Premature failure of a retreaded tire due to tread peel is normally caused by separation of the retread rubber from the buffed surface of the original tire either due to a breakdown of the adhesive bond therebetween or a combination of tread injury and centrifugal force. This type of failure has sharply increased particularly with respect to truck tires because of increased highway speeds and load allowances, so much so in fact that many trucking concerns no longer consider it economical or safe to use retreaded tires.

Tread peel is not ordinarily a problem in new tires since the tread rubber, plys, and sidewalls are vulcanized in a single operation to provide a unitary tire construction which does not depend on an adhesive bond between newly vulcanized rubber and an old vulcanized surface as in the normal retreaded tire construction.

The strength, stability, and resistance to deformation and wear of new tire treads are also much greater than conventional retreads because of the use of one or more reinforcement belts or bands composed of mutually parallel cords of substantially continuous glass or other reinforcement filaments disposed between the tire casing and tread rubber of a new tire. Due to the unitary nature of the tire rubber of a new tire after vulcanization, such reinforcing belts reduce substantially the amount of tread squirm thus resulting in improved tread wear and stability of the tread with respect to its gripping action on the road surface, which is not normally obtained when the same tire is retreaded in conventional manner.

Similar improvements in strength and wear of retreaded tired can be obtained by circumferentially wrapping one or more strands of fiberglass reinforcement cord in spiral manner around a previously buffed tire until a sufficient quantity has been placed on the tire or by wrapping reinforcement belts composed of mutually parallel cords of glass strands around the tire and then covering the reinforcement cord or belts with new tread rubber which is vulcanized in place in conventional manner. However, it has been found that the layers or belts of glass fibers serve to decrease rather than increase the ability of the retreaded tire to resist peel or separation of the retread rubber from the original buffed surface. This is primarily due to the inability of the retread rubber to penetrate and properly contact the buffed tire surface through the spirally wrapped fiberglass cord or belts. If an extremely light layer of fiberglass cord were spirally wrapped in this fashion it might be possible to separate the strands or cords in such a manner as to avoid contact with each other and thus obtain good penetration of the new retread rubber between the cords, in which event adequate adhesion between the new tread rubber and old tire could be achieved. However, the quantity of cord required to be used for proper strength of the retreaded tire is such that the individual cords of the spiral wrappings cannot readily be kept separated. The cords invariably arrange themselves in a close contact, shoulder to shoulder fashion, or are superimposed on each other in such fashion that they prevent adequate retread rubber penetration, whereby the ability of the retreaded tire to resist peel of the newly cured retread rubber is oftentimes not adequate, particularly under present day high-speed, high-load conditions placed on truck tires.

As an example, in the retreading of a typical heavy-duty truck tire it is desirable to use approximately 2 pounds of fiberglass tire cord to achieve the required tire strength. The cord itself may vary in construction, but a typical tire cord would be one designated at 75/5/0. One pound of this cord contains approximately 1,275 yards or sufficient cord to wrap around a buffed 10.00×20 tire 383 times. Two pounds of the same material will provide approximately 763 individual turns around the buffed casing. When arranged in a closely nested shoulder to shoulder fashion, 30 individual cords measure one inch wide. Thus, a single cord thickness of the desired quantity of cord material wrapped around the buffed casing would be 25.5 inches wide. Since the desired wrap surface on a tire of this size is a maximum of 9 inches, it is obvious that almost three layers of individual cords must be used in order to achieve the desired reinforcement. However, if three plys of tightly nested, shoulder to shoulder individual cord thickness material is wrapped around the tread portion of a tire, it is substantially impossible to secure satisfactory penetration of the retread rubber to the buffed surface. The major portion of the adhesion developed by this method is between the new retread rubber and the outer ply of spirally wrapped fiberglass tire cord. Relatively little adhesion of the first single-cord thickness layer or belt to the original tire buffed surface is obtained, and relatively little inner layer adhesion occurs between the three plys of spirally wound fiberglass cord. Thus, a retreaded tire produced in this fashion, while having some desirable characteristics of strength, is more prone to failure by tread peel than a conventionally retreaded tire.

A restrictive band of elastomeric material has previously been wound about the buffed casing contemporaneously with applied filament wound cord, but this still does not solve the problem of inadequate penetration of the elastomeric material between the individual cords, and the elastomeric material itself completely eliminates contact of the retread rubber with the buffed casing. Moreover, in one of the previous known tire retreading methods are the reinforcement cords placed within the retread rubber itself where their high hoop strength will provide the greatest resistance to tread peel and yet not interfere with the desired adhesive bond between the retread rubber and buffed tire casing.

SUMMARY OF THE INVENTION

With the foregoing in mind, it is a principal object of this invention to provide novel tire constructions, particularly retreaded tires, including a reinforcement cord system for the tread portion which imparts greater service life, impact strength, and puncture resistance thereto, and also provides increased tread peel resistance.

Another object is to provide such a tire construction in which both a mechanical interlock and adhesive bond is obtained between the retread rubber and buffed tire casing.

These and other objects of the present invention are achieved by providing a tire construction in which reinforcement cords are placed in the tread rubber where they will not interfere with the adhesive bond between the tread rubber and buffed casing. In fact, the reinforcement cords are greatly resist tread peel because of the mechanical interlock between each of the individual cords and the tread rubber. In one form of the invention, the reinforcement cords are spiral would directly onto the cement coated buffed tire casing to provide a plurality of layers, each layer consisting of a plurality of mutually parallel uniformly spaced apart cords placed in zigzag fashion with the cords in each layer crisscrossing each other to provide an open mesh multilayered pattern or lattice work into and through which the retread rubber is forced during vulcanization. The retread rubber thus applied surrounds the individual cords to provide a mechanical interlock therebetween as aforesaid, and also directly contacts the buffed surface over a large area to achieve a substantial adhesive bond.

Alternatively, the desired zigzag cord pattern may be preplaced on release paper or embedded in a continuous ribbon of elastomeric material and subsequently applied to the buffed tire casing, thus eliminating the need for the retreader having to purchase the necessary equipment for laying the cord pattern himself.

While the invention is primarily concerned with the manufacture of retreaded tires, it will be appreciated that certain of the principles are also applicable to new tires, particularly in the placement of the reinforcement cords directly in the tread portion to provide increased hoop strength and stability in the tread portion of the tire.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings

FIG. 1 is a fragmentary radial section through a preferred form of tire construction made in accordance with the present invention;

FIG. 2 is a fragmentary radial section of the tire construction of FIG. 1 but with the tread portion removed to show the arrangement of reinforcement cords around the tire casing;

FIG. 3 is a fragmentary to plan view of the tire construction of FIG. 2, taken on the plane of the line 3—3, to show the crisscross pattern of the various reinforcement cord layers;

FIGS. 4 and 5 are respectively schematic top plan and side elevation views illustrating the manner of applying the reinforcement cords to the buffed tire casing as shown in FIGS. 1 through 3;

FIGS. 6 and 7 are respectively schematic top plan and side elevation views illustrating a manner of applying reinforcement cords to release paper in a desired pattern;

FIG. 8 is a schematic side elevation view showing a manner of transferring the reinforcement cord pattern from the release paper of FIG. 7 to be buffed tire casing;

FIG. 9 is a schematic side elevational view showing a manner of embedding reinforcement cord in a continuous strip of elastomeric material and winding the same around a buffed tire casing; and FIG. 10 is a fragmentary radial section showing a tire construction made in accordance with the method illustrated in FIG. 9 prior to vulcanization of the tread rubber.

DESCRIPTION OF THE PREFERRED EMBODIMENTS

Referring now in detail to the drawings and first to FIGS. 1 through 3, there is shown a pneumatic tire 1 which may be of any conventional type for use on passenger cars, trucks, or off-the-road equipment, including a carcass or casing 2 consisting of one or more plys 3 and sidewalls 4. One or more of the plys 3 may contain reinforcement cords of fiber glass or other reinforcement material. The tire is shown with its original tread portion removed after substantial wear to prepare the tire for retreading in a manner to be subsequently fully explained. Removal of the tread is preformed with the tire 1 properly inflated and mounted on a rotating mandrel precise feeding of the tire into a power driven circular-shaped rasp which uniformly cuts off the old tread without injuring the carcass plys, thus leaving the tire with a smooth buffed outer surface 5.

Normally, the new retread runner is simply adhered to the outer buffed surface 5 using a suitable air drying cement and then vulcanized in a conventional vulcanizing mold. However, there has been considerable objection to such retreaded tires because of premature failure due to tread peel, which is most frequently caused by a breakdown of the adhesive bond between the tread rubber and tire casing and the high centrifugal which results when the tire is driven at high speeds and under high loads tending to separate the tread rubber from the tire casing. Such failures are particularly prevalent with retreaded truck tires due to increased highway speed and load allowances for trucks. The normal life of a retreaded tire made in accordance with previous practices is also much shorter than the normal expected life of a new tire tread in use. These two factors and the safety hazards created thereby have greatly limited the use of retreaded tires, despite the apparent economics of retreading.

It has been found, however, that if a plurality of layers of substantially continuous reinforcement cords are circumferentially spirally wrapped around the buffed tire in accordance with this invention before the retread rubber is applied, the tread peeling deficiencies previously described will be eliminated, and, moreover, the retreaded tire will have a greatly enhanced service life and greater impact strength and puncture resistance. Although the reinforcement cord is preferably made of fiberglass, it will be apparent that other reinforcement cord materials may also be used, including synthetic and natural fiber materials and metallic wire or cord.

More particularly, and as clearly shown in FIGS. 1 through 3, each reinforcement cord layer 6 consists of one or more closely spaced apart mutually parallel cords 7 which have been wound in a symmetrical or uniform zigzag pattern so that adjacent layers crisscross each other to provide an open mesh multilayered reinforcement cord system in which the individual cords or strands are separated or isolated from each other except for the contact points where the cords in each succeeding layer cross over the cords of the previously deposited layer.

The individual fiberglass cords 7 in each layer 6 are sufficiently spaced from each other to provide a substantial open area between cords so that preferably between one-third to two-thirds of the area of each layer is left open to permit the soft new retread rubber 8 which is subsequently forcibly pressed onto the tire to penetrate into and through the cord layers 6 to obtain the desired adhesion between the retread rubber 8 and buffed tire casing 1. If 75/5/0 tire cord is used, a spacing of approximately 10 cords per inch of width will provide adequate open area for effective penetration of the thread material.

Because the cords of each successive layer crisscross each other, as aforesaid, they will always maintain the desired open mesh pattern and will not rearrange themselves in a close contact, shoulder to shoulder fashion, as would likely happen if the cords were simply spirally wound onto the casing in the usual nonzigzagging manner. Another advantage of providing an open mesh pattern is that it enables the new tread rubber being applied to surround each of the individual cords 7 in each layer 6 and thus provides a mechanical interlock therebetween as well as an adhesive bond. Accordingly, the reinforcement cords 6, which have a very high loop strength, will greatly assist in retaining the tread rubber 8 against peel off. Moreover, because of the mechanical interlock between the retread rubber and cords produced by the open lattice work, atmospheric or chemical variations which might serve to deteriorate the effectiveness of the chemical adhesive bond between the retread rubber, buffed tire surface, and reinforcement cords will not in any way disturb the effectiveness of the reinforcement cords in holding the retread rubber in place. Another advantage obtained in locating the reinforcement cords directly in the retread rubber itself instead of between the tire casing and retread rubber is that the reinforcement cords will more effectively eliminate tread squirm which is the primary cause of short tread life. Placement of the reinforcement cords outwardly within the tread of a new tire may also be advantageously used to strengthen the tread portion and reduce squirm.

Although the angle of wrap a of the cords 7 which continuously reverse around the buffed tire with respect to the peripheral center line of the tire at any given point may vary substantially depending upon the circumference of the tire (the greater the circumference, the smaller permissible angle), the width of the surface being rapped, and width of the wrap itself, it is preferred that such angle be as small as practical without disturbing the desired open mesh pattern of the individual layers of cords, since a zero wrap angle produces the maximum strength in the hoop direction by placing the strands in pure tension and provides maximum improvement in tread life. However, at extremely low angles, it is difficult to secure effective cord crossover since the cords in adjacent layers tend to push each other aside and become parallel. As a practical matter, it has been found that angles of from slightly less than 1° to approximately 12° will provide the desired crossover patter and still achieve sufficient hoop strength for long tread life.

One preferred method of applying the reinforcement cords 7 to the buffed tire 1 is schematically illustrated in FIGS. 4 and 5. The buffed tire 1 is shown mounted on a conventional retread tire building machine 10 which is ordinarily employed for wrapping die sized rubber or camel back around the tire, and includes a pair of idle mandrels 11 and 12 and a motor driven mandrel 13 engaging the beads 14 of the tire. One of the mandrels is adjustable to permit mounting and removal of the tire therefrom.

The fiberglass cords 7 which are to be wound about the tire may be used as is, or first impregnated in known manner to provide a coating thereon for protection against interfilament destructive action and enhance the bonding between the glass fiber surfaces and the retread rubber material. In any event, a plurality of single-cord serving packages 15 are provided on a support stand 16 radially spaced from the tire building machine, from which the individual cords 6 are passed through a system of guide eyes 17 and individual adjustable tension controlling devices 18 which allow the individual cords to be drawn from the packages at different rates of speed to provide the different cord lengths required for uniform feed rotation of the tire being wrapped. Since the buffed surface 5 of the tire 1 is slightly round in cross section, it will be apparent that the cords which are wrapped around the center of the buffed tire will be drawn forward at a greater rate of speed than the cords wrapped around the outside portions of the buffed tire surface.

After merging from the tensioning devices 18, the individual cords 7 are passed through a warp guide or leveling reed 19 which serves to maintain the cords in individually aligned positions and also provides a horizontally level warp. Next the individual cords are threaded through an adjustable width reed or comb rack 20 which also maintains the individual positioning of the cords and allows for quick changing of the overall width of each layer or belt in accordance with he width of the tires being retreaded. From there the individual cords layers passed over a amount of driven, reverse roll liquid cement coating device 21 of conventional type which applies a suitable air drying cement 22 to the bottom surfaces only of the cords through contact with the upper roller 23. Now the reinforcing cords 7 are carefully positioned on the buffed tire surface 5 with the desired spacing therebetween and the tire is slowly rotated at uniform speed to draw the cords onto the buffed tire. As the tire rotates, the cords pass beneath pressure rollers 24 which press the bottom most layer of cords firmly in position on the buffed tire surface, and each succeeding layer against the adjacent layer therebeneath. To obtain the desired zigzag pattern of the cord layers 6 for proper crossover of the cords of each successive layer, the width adjustable reed or comb rack 20 is slowly reciprocated back and forth as the cords are wrapped onto the rotating tire. The rate of reciprocating motion of the adjustable width comb rack 20 will vary depending on the rate of rotation of the tire and the desired cord angle, and is adjustable to produce a desired amount of horizontal displacement of the cord layers for a given amount of tire rotation, as for example, ½ inch horizontal displacement of the entire cord layer or belt for each 160° tire rotation. The reciprocating motion is continued until a sufficient weight and length of cord material has been wrapped around the tire to produce the desired strength. As an example, it may be desired to apply 2 pounds or approximately 2,550 yards of individual fiberglass tire cords to a typical heavy duty 10.00×20 buffed casing over a width of 10 inches, in which event each layer of cord material of the preferred 10 cords per inch in width would be approximately 9½ cord layers, which would place the outer cord layers some distance from the buffed surface of the tire.

After the desired number of reinforcement cord layers 6 have been applied to the buffed surface and cemented down as just described, the entire belted portion of the tire is sprayed with a high quality air-drying cement, which not only coasts the large portion of the buffed tire surface 5 left exposed after the cord layers have been applied, but also coats the individual cords themselves to provide a substantial increase in the surface area covered by the cement. This greatly enhances the adhesive bond between the retread rubber which is later applied and the buffed tire, of which the cord layers are now a part. The latter cement coating may be applied while the tire 1 is still on the machine 10 used for winding the reinforcement cords onto the tire, but it is preferably applied after the wrapped tire 1 has been transferred to a conventional die sized rubber tire builder or strip tire builder (not shown) so that the die sized or strip rubber can be immediately applied thereafter.

During wrapping of the die sized or strip rubber about the belted casing 1, rollers subject to high pressures contact the outer surface of the rubber and press the rubber, which is then soft and uncured into and around the individual cords of each layer. This occurs despite the fact that the outer layers are separated some distance from the buffed surface of the tire because of the relatively open mesh pattern of the reinforcement layers. The net result is that there is an improved adhesive bond between the tire and retread rubber because of the increased surface area of the cords and buffed surface of the tire covered by cement and contacted by the retread rubber, which is enhanced by a mechanical or interlocking connection between the open lattice cord layers and the surrounding cured rubber. Since this latter interlocking connection is positive in nature, it is unaffected by atmospheric or chemical variations that may serve to deteriorate the effectiveness of the cement bond, thus, ensuring against tread peel. The final step in the retreading operation is to cure the retread rubber in a conventional vulcanizing mold, during which the tread design is also formed in the outer surface of the retread rubber.

While the method just described in an effective and simple way of applying the reinforcement cords to a buffed tire surface, nevertheless it does require specialized equipment for producing the required cord patterns, which makes it somewhat impractical for use by each of the thousands of existing tire retreading companies. However, this requirement may be obviated by making available to the individual retreaders prewound cord patterns held in place on continuous strips of mold release paper of suitable type which will not adhere to the cement used in the retreading operation. The predetermined pattern of reinforcing cords is maintained in fixed position on the release paper by chemically or mechanically eliminating the release film from spaced-apart zones along the length of the release paper and placing on the paper in those areas a narrow strip of adhesive which is sufficient to hold the cords in the proper relative position. The spacing and number of adhesive strips should be sufficient to provide the required pattern holding ability and still permit ready transfer of the cord pattern from the release paper to be cement coated buffed tire without the release paper adhering to the cemented surface. Portions of the adhesive strips may be pulled from the surface of the release paper by contact with the tire, but the composition of the cements used on the release paper and tire may be similar so that no deterioration due to mixing of the cements will occur. While the width of the cement strips on the release paper and distance therebetween may vary widely, it will be apparent that the less cement on the release paper, the less problem there will be of the release paper adhering to the tire, but, of course, the cement strips must be adequate to maintain the relative positions of the cord patterns as aforesaid.

FIGS. 6 and 7 illustrate schematically the manner in which a particular cord pattern 25 may be adhered to a continuous length of release paper 26 which is shown stored on a rotatable spool 27. The outer end of the release paper is threaded between a plurality of horizontally spaced pairs of rolls 28 for pressing of the mutually parallel reinforcing cords 7 into contact with spaced apart adhesive strips 29 on the release paper as the release paper is pulled between the rolls and is wound about a second spool 30. The number and spacing of the individual cords applied to the release paper maybe varied as desired, as may the cord paper, which is controlled by passing the cords which are stored on individual spools 31 through an adjustable width, reciprocable reed or comb rack 32 to maintain the individual positioning of the cords and produce a horizontal displacement of the cords to achieve the desired zigzag pattern. Individual guide eyes 33 and tensioning devices 34 may also be provided for passage of the individual cords therethrough prior to passage through the comb rack 32.

The cord patterns thus preplaced on the release paper 26 may readily be transferred to a buffed casing 1 using conventional retreading equipment 35 on which the buffed tire is mounted for rotation as shown in FIG. 8. As the buffed tire 1 is rotated, cement is sprayed over the entire buffed surface 5 and the cord side of the release paper 26 is pressed against the cement coated surface as shown, after which the release paper is stripped away leaving the cord pattern in place on the tire. Care should be taken to pay the release paper out in a perfectly straight line toward the buffed tire surface so that the cord pattern is accurately reproduced on the tire. As each separate cord layer is applied to the tire, the outer surface thereof is sprayed with cement by a spraying device 36 so that the next succeeding layer will properly adhere thereto, and so on. When the desired number of cords layers has been applied to the tire, the release paper is sheared through to cut the individual cords 7, and the cord wrapped casing 1 is then wound with die sized rubber or camel back, with sufficient pressure applied to force the die sized rubber into and around the individual cord layers as previously described. Finally, the retread rubber is cured in conventional manner.

In still another form of the invention shown in FIG. 9, the desired reinforcement cord pattern is first applied to a continuous thin strip 37 of uncured rubber or other suitable elastomeric material which has been extruded through a die of a conventional extruder 38 to produce the required width of strip material for the particular tire being retreaded. A typical strip emerging from the extruder 38 is one-sixteenth inch thick and 7½ inches wide, and is supported by a series of rollers 39. Individual reinforcement cords 7 are fed from suitable individual supply packages 40 into contact with the upper surface 41 of the extruded rubber 37 and by means of nipper rolls 42 are lightly pressed into the rubber strip, which because of its soft, adhesive nature, will securely hold the cords in place. The reinforcement cords are arranged in parallel fashion prior to contacting the rubber strip 37 by a conventional adjustable reed or guide bar 43 which may be adjusted to obtain any desired spacing or separation distance between the cords. However, no more than one cord thickness can be effectively bonded to the surface of the rubber strip in this manner, and accordingly, a neatly arranged shoulder to shoulder warp is the maximum allowable warp density. The lower limit of warp density will vary depending on the weight and strength of reinforcement cords desired.

The composite rubber and cord strip thus produced may be wound on a drum for later use, or fed directly onto the buffed surface of a tire 1 to be retreaded as shown in FIG. 9. The tire 1 is supported for rotation on the rotatable mandrel 45 of conventional tire-building machine 46, and is sprayed with a suitable adhesive as it rotates past a spray nozzle 47. For each complete rotation of the tire, a one sixteenth inch thickness of tread rubber strip with the reinforcement cords embedded in the upper surface thereof is wrapped about the tire. After the desired number of spirally wound reinforcement cord layers is obtained (in this case six), the individual cords 7 are sheared by actuation of a knife 48, but the strip rubber 37 without the cords embedded therein is continued to be spirally wrapped about the tire to obtain the final desired thickness of retread rubber, as shown in FIG. 10. Reinforcement cords are not placed throughout the total thickness of the retread rubber since that would put a great many cords on or adjacent the outer surface of the tread where they would be distorted when the tread pattern was subsequently molded into the outer tread area. Accordingly, it is preferred that the cord layers be located no nearer to the outer surface of the tread rubber than the bottom of the tread pattern indents to be subsequently formed therein. The cords 7 are desirably sheared on a bias to minimize weight variations caused by starting and terminating the cord feed. After the desired number of reinforced and nonreinforced strip layers have been wrapped about the buffed tire surface, the tire is bagged and placed in a mold for conventional curing of the retread rubber.

This latter method of retreading tires, like the methods previously described, places the reinforcement cords 7 within he new tread rubber at some distance outward from the buffed tire surface where they are most effective in preventing tread peel. In addition, however, this latter method has several distinct advantages advantages over the previously discussed methods. Because the reinforcement cords are pressed into the outer surface, each reinforcement cord layer is already separated from the other and the individual cords are completely surrounded by retread rubber material. Accordingly, there is no need to maintain any particular spacing between the cords, and the cords need not be angularly disposed in zigzag fashion, as is required by the other disclosed methods for complete penetration of the retread rubber throughout the cord layers. Thus, the reinforcement cords may be arranged continuously with substantially zero angle between the cords and circumference of the tire, whereby the high tensile strength of the reinforcement cords may be employed to its maximum benefit.

Another advantage obtained with this latter method is increased impact resistance due to the cushioning effect of the strip rubber thickness between each of the cord layers. In use, tires are subjected to frequent and severe impacts which cause deflection of the tire and high tension in the fiberglass cords. Although fiberglass is relatively inextensible, having a maximum of 4 percent elongation prior to failure, because the reinforcement cords are separated by a thickness of rubber material which is cushioning in nature, the cords will absorb greater impact without failure. While this effect is small for a single cord, it is greatly magnified through the use of hundreds of cords arranged in a similar fashion. "When wound in a circumferential pattern such as is common in the filament winding method of producing circular reinforced products, fiberglass strands can product from 250,000 to 300,000 lbs. per sq. in. of tensile strength. This compares favorably with the better grades of synthetic fiber such as rayon, nylon or polyester which have tensile strengths in the range of from 10,000 to 20,000 lbs. per sq. in. Thus, variations in the straight circumferential pattern for the fiberglass strands will still retain substantial strength advantages over other known strands suitable for tire reinforcement.

One such variation is the employment of the zigzag pattern previously described. Rubber and strands made from synthetic resins are known for their ability to elongate prior to failure; elongation on the order of 10 percent is common in such materials. Fiberglass is relatively inextensible with a maximum of 4 to 6 percent stretch before failure. If, however, the fiberglass strands are arranged in the described zigzag pattern wherein they are disposed at an angle with respect to the centerline of the tire, it will be apparent that some elongation will be permitted by straightening of the fiberglass strands in the rubber matrix."

From the foregoing, it will now be apparent that the placement of reinforcement cords in thread rubber with thread rubber completely surrounding the cords in the manner disclosed herein will greatly resist thread peel and add greater strength and stability in the thread rubber. By selectively placing the reinforcement cords as close as possible to the outer surface of the thread portion of the tire in the manner described herein, outer thread stability is greatly improved, which results in much greater thread life. Thus, not only will the tire casing have great hoop strength when wrapped with reinforcement cords in known manner, but the thread portion itself will have its own independent hoop strength due to the reinforcement cords placed directly therein, which greatly reduces the chances of the thread peeling away from the reinforced tire casing. These same principles may also be advantageously used in strengthening the thread portion of new tire constructions.

I claim:

1. In a tire comprising an inner annular casing portion and an outer circumferential thread portion; a plurality of circumferentially disposed reinforcement cords arranged in outwardly spirally wrapped layers within said thread portion, said cords being continuous throughout more than one of said spirally wrapped layers.

2. The tire of claim 1 wherein the cords in each layer are spaced apart from each other and are arranged in a symmetrical zigzag pattern, the space around the cords being filled by the material of said thread portion.

3. The tire of claim 1 wherein the cords in each layer are spaced apart from each other and are arranged in a symmetrical zigzag pattern with adjacent layers crisscrossing each other to provide space around he cords in each layer which is filled by the material of said thread portion.

4. The tire of claim 1 wherein each layer of reinforcement cords is separated by a layer of the material of said thread portion.

5. The tire of claim 1 wherein said thread portion consists of outwardly spirally wrapped layers off elastomeric material in which said reinforcement cords are embedded.

6. The tire of claim 1 wherein the angle of wrap of said cords with respect to the peripheral centerline of said tire continuously reverses.

7. The tire of claim 1 wherein said reinforcement cords consist of fiberglass strands.

8. The tire of claim 1 wherein the cords in each layer have a spacing of approximately 10 cords per inch of width to expose a substantial portion of the outer surface of said casing portion for direct contact by said tread portion.

7. The tire of claim 1 wherein said tread portion has a tread pattern in the outer periphery thereof and said spirally wrapped layers extend from the outer ply of said inner annular casing portion to the bottom of said tread pattern uniformly distributing said reinforcement cords throughout said tread portion.

10. In a tire comprising an inner annular casing portion and an outer circumferential tread portion having a tread pattern in the outer periphery thereof, a plurality of circumferentially disposed reinforcement cords embedded throughout the tread portion from the outer ply of said inner annular casing portion to the bottom of said tread pattern.

11. The tire of claim 10 wherein said reinforcement cords are arranged in a plurality of outwardly spirally wound layers, said cords in each layer being spaced apart from each other and arranged in a symmetrical zigzag pattern with adjacent layers crisscrossing each other to provide space around the cords in each layer which is filled by the material of said tread portion.

12. The tire of claim 10 wherein said tire is a retreaded tire.

13. A retreaded tire comprising a tire casing having an outer smooth surface and a newly applied tread portion bonded thereto, said tread portion having a plurality of circumferentially disposed reinforcement cords arranged in a plurality of outwardly spiraled wound layers within said tread portion, said cords being continuous throughout more than one of said spirally wound layers.

14. The tire of claim 13 wherein said reinforcement cords are separated from each other by the material of said tread portion.

15. The tire of claim 13 wherein said tread portion consists of a plurality of inner circumferential spirally overlying wraps of continuous tread material each having a cord layer embedded in the outer surface thereof, and a plurality of outer circumferential spirally overlying wraps of tread material surrounding said inner wraps, said outer and inner wraps having been cured to provide a unitary construction with the tread pattern indents in said outer layers only.

16. The tire of claim 13 wherein the cords in each layer are spaced apart from each other and arranged in a zigzag pattern with the cords in adjacent layers crisscrossing each other to provide room therebetween for penetration of the material of the tread portion into and through the cord layers and substantial direct contact of the tread portion with the outer smooth surface of said tire casing.

17. The tire of claim 16 further comprising an adhesive coating on said outer surface of said tire casing and on said cords which provides an adhesive bond between the tread portion and said cords and the outer surface of said tire casing.